(12) United States Patent
Chen et al.

(10) Patent No.: US 7,212,336 B2
(45) Date of Patent: May 1, 2007

(54) OPTICAL FILTER SCREENING OUT INFRARED AND ULTRAVIOLET LIGHT

(75) Inventors: Ga-Lane Chen, Fremont, CA (US); Ching-Chou Chang, Tu-Cheng (TW)

(73) Assignee: Hon Hai Precision Industry Co. Ltd, Taipei Hsien (TW)

( * ) Notice: Subject to any disclaimer, the term of this patent is extended or adjusted under 35 U.S.C. 154(b) by 0 days.

(21) Appl. No.: 11/416,725

(22) Filed: May 3, 2006

(65) Prior Publication Data

US 2007/0002432 A1   Jan. 4, 2007

(30) Foreign Application Priority Data

Jul. 1, 2005   (TW) ............... 94122298 A

(51) Int. Cl.
*F21V 9/04* (2006.01)
*G02B 1/10* (2006.01)

(52) U.S. Cl. ............ 359/359; 359/361; 359/584; 359/588; 359/589

(58) Field of Classification Search ........ 359/350–361, 359/557, 590
See application file for complete search history.

(56) References Cited

U.S. PATENT DOCUMENTS

| | | | |
|---|---|---|---|
| 2,444,976 A | 7/1948 | Brown | 359/361 |
| 4,229,066 A * | 10/1980 | Rancourt et al. | 359/359 |
| 5,274,661 A * | 12/1993 | von Gunten et al. | 372/99 |
| 5,360,659 A * | 11/1994 | Arends et al. | 428/216 |
| 5,926,317 A * | 7/1999 | Cushing | 359/588 |
| 5,982,078 A * | 11/1999 | Krisl et al. | 313/112 |
| 6,611,378 B1 * | 8/2003 | Wang et al. | 359/588 |
| 6,631,033 B1 * | 10/2003 | Lewis | 359/584 |
| 6,927,900 B2 * | 8/2005 | Liu et al. | 359/359 |

* cited by examiner

*Primary Examiner*—Thong Q. Nguyen
(74) *Attorney, Agent, or Firm*—Jeffrey T. Knapp

(57) ABSTRACT

An optical filter includes a transparent substrate, a first film stack and a second film stack. The first and second film stacks each includes a number of high refractive index layers and a number of low refractive index layers alternately stacked one on another. The first film stack is defined as $(HL)^7(0.76H0.76L)^6$, and the second film stack is defined as $0.5(HL)(1.3H1.3L)^9(HL)^8$, wherein, H represents a high refractive index layer having a base optical thickness equal to one fourth of a first reference wavelength associated with the optical filter, L represents a low refractive index layer having a base optical thickness equal to one fourth of a first reference wavelength associated with the optical filter, the expression enclosed in each parenthesis represents a filter cavity, and the superscript represents the number of repetition of the expression enclosed in that parenthesis.

8 Claims, 3 Drawing Sheets

OPTICAL FILTER SCREENING OUT INFRARED AND ULTRAVIOLET LIGHT

TECHNICAL FIELD

The present invention generally relates to optical filters, and more particularly to an optical filter which can screen out infrared and ultraviolet rays while permitting visible light to be transmitted therethrough.

BACKGROUND

Glass used in windshields, windows and other openings of aircraft or automobiles not only has the function of protecting pilots and crew from outside airflow but also acts to screen out injurious solar rays and exclude solar heat from the interior of the vehicle.

The harmful rays contained in the solar radiation are mainly in the ultraviolet (UV) and infrared (IR) spectrum. A conventional optical filter for screening out both ultraviolet and infrared rays is composed of ultraviolet absorption glass coupled with infrared absorption glass. The ultraviolet absorption glass is produced by adding a certain of ultraviolet cut-off material into an ordinary glass to render the ultraviolet absorption glass capable of screening out the ultraviolet rays. The ultraviolet cut-off material is mainly composed of cerium hydrate and titanium oxide. The infrared absorption glass is produced by adding an amount of infrared cut-off material to an ordinary glass to render the infrared absorption glass capable of screening out the infrared radiation. The infrared cut-off material includes iron oxide or a compound containing iron oxide. In this conventional optical filter, the UV and IR radiations are screened out by the absorption agent, so a filtering quality of the optical filter is greatly limited. In addition, the conventional optical filter is made of two pieces of absorption glasses, thus rendering a complexity in structure.

Therefore, it is desired to provide an improved optical filter that overcomes the above-described problems.

SUMMARY

An optical filter for cutting off infrared and ultraviolet light includes a transparent substrate, a first film stack and a second film stack. The transparent substrate has a first surface and an opposite second surface. The first film stack is formed on the first surface of the substrate, and the second film stack is formed on the second surface of the substrate. The first and second film stacks each includes a number of high refractive index layers and a number of low refractive index layers alternately stacked one on another. The first film stack is represented as follows: $(HL)^7(0.76H0.76L)^6$, wherein, H represents a high refractive index layer having a base optical thickness equal to one fourth of a first reference wavelength associated with the optical filter, L represents a low refractive index layer having a base optical thickness equal to one fourth of first reference wavelength associated with the optical filter, the expression enclosed in each parenthesis represents a filter cavity, and the superscript represents the number of repetition of the expression enclosed in that parenthesis. The second film stack is represented as follows: $0.5(HL)(1.3H1.3L)^9(HL)^8$, wherein, H represents a high refractive index layer having a base optical thickness equal to one fourth of a second reference wavelength associated with the optical filter, L represents a low refractive index layer having a base optical thickness equal to one fourth of second reference wavelength associated with the optical filter, the expression enclosed in each parenthesis represents a filter cavity, and the superscript represents the number of repetition of the expression enclosed in that parenthesis.

Advantages and novel features will become more apparent from the following detailed description when taken in conjunction with the accompanying drawings.

BRIEF DESCRIPTION OF THE DRAWINGS

Many aspects of the present optical filter can be better understood with reference to the following drawings. The components in the drawings are not necessarily drawn to scale, the emphasis instead being placed upon clearly illustrating the principles of the present optical filter. Moreover, in the drawings, like reference numerals designate corresponding parts throughout the several views.

DETAILED DESCRIPTION OF PREFERRED EMBODIMENTS

Figure 1:
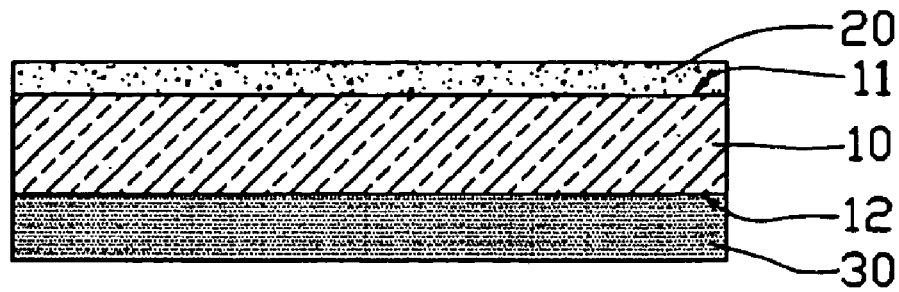
FIG. 1 is a schematic, cross-sectional view of an optical filter for screening out and ultraviolet radiations, in accordance with a first embodiment.

Referring to FIG. 1, an optical filter 100 for screening out ultraviolet and infrared light according to a first embodiment is shown. The optical filter 100 can be used in the windshields, windows and other openings of aircraft or automobiles. The optical filter 100 includes a transparent substrate 10, a first film stack 20, i.e. an ultraviolet cut-off multilayer film, and a second film stack 30, i.e. an infrared cut-off multilayer film. In this embodiment, the transparent substrate 10 may be used as a window of an aircraft. The transparent substrate 10 has a first surface 11 and an opposite second surface 12. The first film stack 20 is formed onto the first surface 11, and the second film stack 30 is formed onto the second surface 12. The transparent substrate 10 can be made of glass, ceramic, or plastic.

Figure 2:
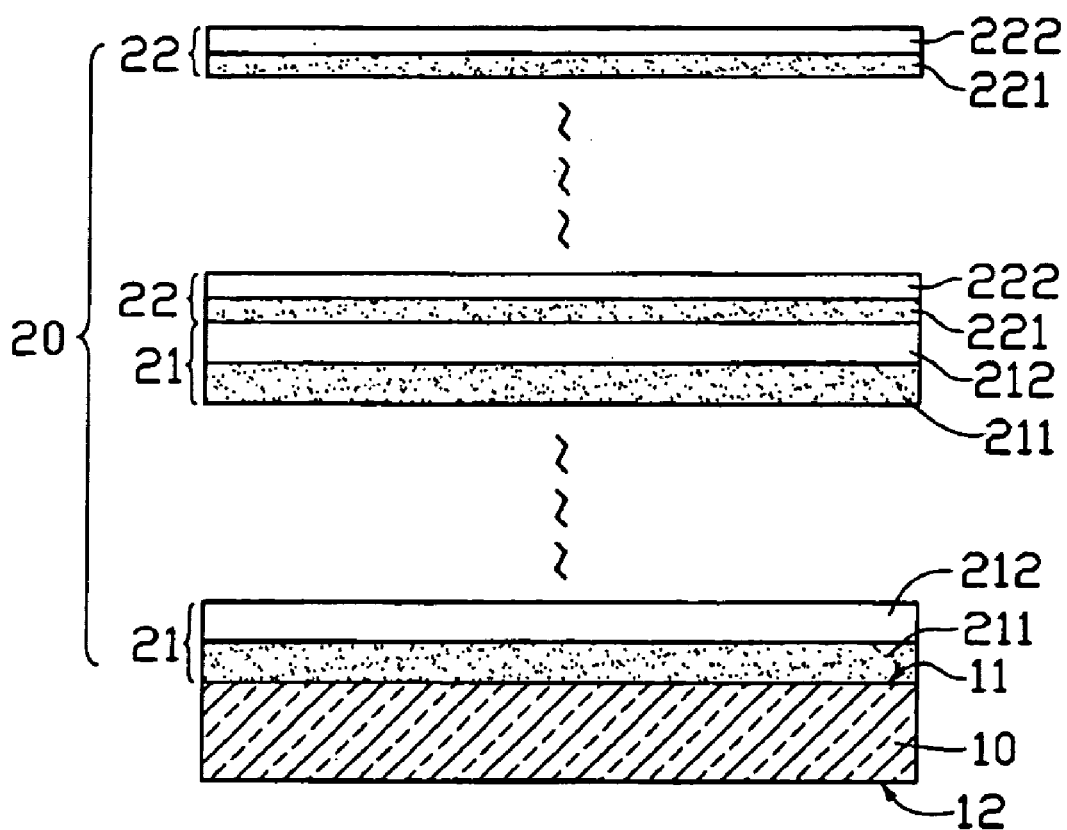
FIG. 2 is a schematic, exploded view of a substrate and a first film stack of the optical filter in FIG. 1.

Referring to FIG. 2, the first film stack 20 may be represented as follows: $(HL)^7(0.76H0.76L)^6$, wherein, H represents a high refractive index layer having a base optical thickness equal to one fourth of a first reference wavelength $\lambda_1$ associated with the optical filter, L represents a low refractive index layer having a base optical thickness equal to one fourth of a first reference wavelength $\lambda_1$ associated with the optical filter, the expression enclosed in each parenthesis represents a filter cavity, and the superscript represents the number of repetition of the expression enclosed in that parenthesis.

In the first film stack 20, (HL) represents a first filter cavity 21 consisting of a high refractive index layer 211 and a low refractive index layer 212, and (0.76H0.76L) represents a second filter cavity 22 consisting of a high refractive index layer 221 and a low refractive index layer 222. The first film stack 20 includes seven first filter cavities 21 and six second filter cavities 22 formed on the seven first filter cavities 21. In the first filter cavity 21, the high and low refractive index layers 211, 212 have a same optical thickness equal to $1 \times (\lambda_1/4)$. In the second filter cavity 22, the high and low refractive index layers 221, 222 have a same optical thickness equal to $0.76 \times (\lambda_1/4)$. If a refractive index of the high refractive index layers 211, 221 is represented by $n_H$, then a physical thickness of the high refractive index layers 211, 221 is equal to $1 \times (\lambda_1/4)/n_H$. If refractive index of the low refractive index layers 212, 222 is represented by $n_L$, then a physical thickness of the low refractive index layers 212, 222 is equal to $1 \times (\lambda_1 1/4)/n_L$.

In the first film stack 20, the high refractive index layers 211, 221 are made of a material selected from the group consisting of titanium dioxide ($TiO_2$), titanium pentoxide ($TiO_5$) and tantalum pentoxide ($Ta_2O_5$). The low refractive index layers 212, 222 are made of a material selected from the group consisting of silicon dioxide ($SiO_2$) and aluminum oxide ($Al_2O_3$). For example, the high refractive index layers 211, 221 are in which case, the reflective index $n_H$ is equal to 2.311. The low refractive index layers 212, 222 are made of $SiO_2$, in which case, the reflective index $n_L$ is equal to 1.473. Because the wavelength of the ultraviolet light is in the range from 200 to 400 nanometers, so a value of $\lambda_1$ for the first film stack 20 is determined. Accordingly, the numerical values of H and L are also determined. A thickness of each layer of the film stack 20 is shown in Table 1-1. The layers are numbered from an innermost layer attached to the first surface 11 of the transparent substrate 10 to an outermost layer outwardly exposed.

TABLE 1-1

| Number of layer | Thickness |
| --- | --- |
| 1 | H |
| 2 | L |
| 3 | H |
| 4 | L |
| 5 | H |
| 6 | L |
| 7 | H |
| 8 | L |
| 9 | H |
| 10 | L |
| 11 | H |
| 12 | L |
| 13 | H |
| 14 | L |
| 15 | 0.76 H |
| 16 | 0.76 L |
| 17 | 0.76 H |
| 18 | 0.76 L |
| 19 | 0.76 H |
| 20 | 0.76 L |
| 21 | 0.76 H |
| 22 | 0.76 L |
| 23 | 0.76 H |
| 24 | 0.76 L |
| 25 | 0.76 H |
| 26 | 0.76 L |

The film structure of the first film stack 20 in Table 1-1 may be further optimized. According to a predetermined visible light transmission, such as ninety-five percent of the visible light transmission, a group of optimized thickness values for substantially screening out the ultraviolet light can be obtained. The optimized thickness of each layer of the first film stack 20 is shown in Table 1-2. The layers are numbered from an innermost layer connecting with the first surface 11 of the transparent substrate 10 to an outermost layer outwardly exposed.

TABLE 1-2

| Number of layer | Optimized thickness |
| --- | --- |
| 1 | 0.372 H |
| 2 | 1.203 L |
| 3 | 0.849 H |
| 4 | 0.962 L |
| 5 | 1.064 H |
| 6 | 0.967 L |
| 7 | 1.048 H |
| 8 | 1.011 L |
| 9 | 1.045 H |
| 10 | 0.988 L |
| 11 | 1.061 H |
| 12 | 0.960 L |
| 13 | 1.017 H |
| 14 | 0.993 L |
| 15 | 0.698 H |
| 16 | 0.764 L |
| 17 | 0.477 H |
| 18 | 0.818 L |
| 19 | 0.787 H |
| 20 | 0.679 L |
| 21 | 0.822 H |
| 22 | 0.389 L |
| 23 | 0.946 H |
| 24 | 0.655 L |
| 25 | 0.764 H |
| 26 | 2.183 L |

In the optimized first film stack 20, the values of H and L are not changed, but the coefficients of H and L are changed for optimization. As shown in table 1-2, the optimized first film stack 20 can be defined as follows: $(a_1Ha_2L)^7(b_1Hb_2L)^6$, wherein, $a_1$, is in the range from 0.372 to 1.064, $a_2$ is in the range from 0.962 to 1.203, $b_1$ is in the range from 0.477 to 0.946, $b_2$ is in the range from 0.389 to 2.183.

Figure 3:
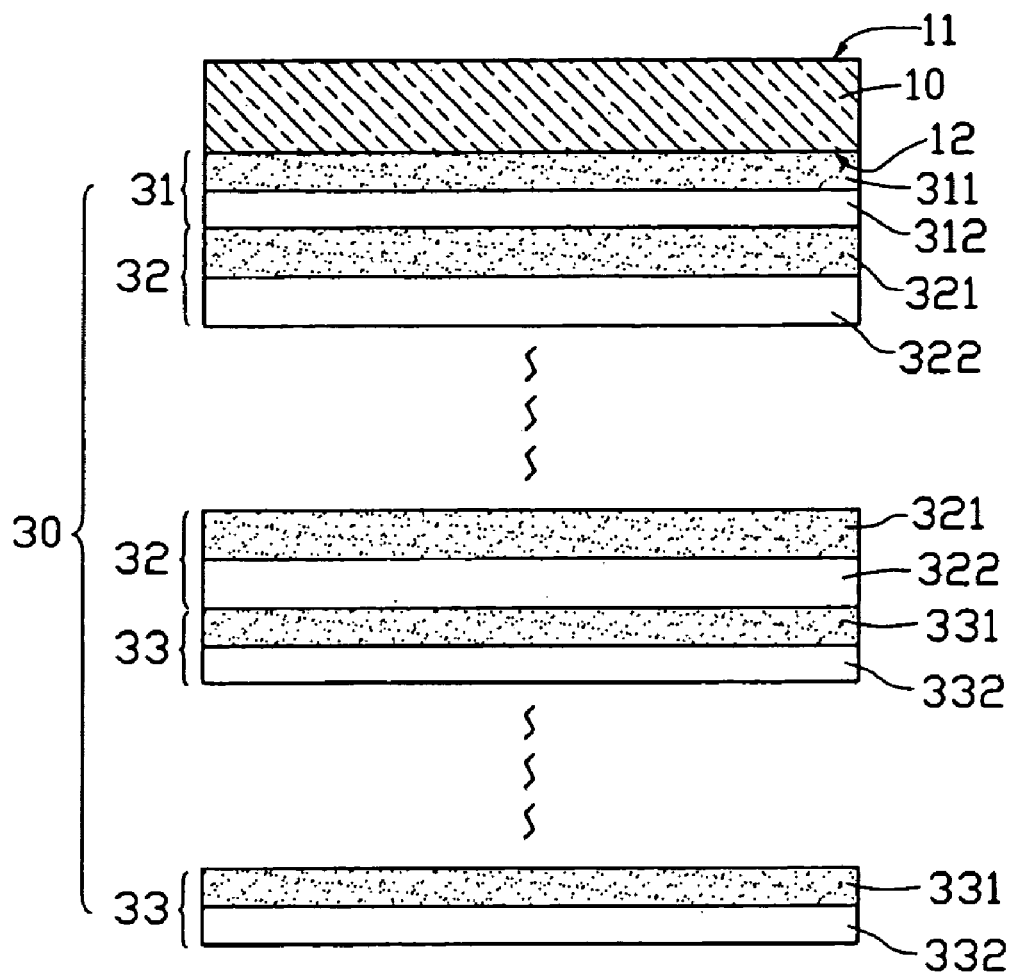
FIG. 3 is a schematic, exploded view of the substrate and a second film stack of the optical filter in FIG. 1.

Referring to FIG. 3, the second film stack 30 may be represented as follow: $0.5(HL)(1.3H1.3L)^9(HL)^8$, wherein, H represents a high refractive index layer having a base optical thickness equal to one fourth of a second reference wavelength $\lambda_2$ associated with the optical filter, and where L represents a low refractive index layer having a base optical thickness equal to one fourth of a second reference wavelength $\lambda_2$ associated with the optical filter, the expression enclosed in each parenthesis represents a filter cavity, and the superscript represents the number of repetitions of the expression enclosed in that parenthesis.

In the second film stack 30, in the expression of 0.5(HL), (HL) represents a third filter cavity 31 consisting of a high refractive index layer 311 and a low refractive index layer 312, and 0.5 is a coefficient of the third filter cavity 31; (1.3H1.3L) represents a fourth filter cavity 32 consisting of a high refractive index layer 321 and a low refractive index layer 322, and (HL) represents a fifth filter cavity 33 consisting of a high refractive index layer 331 and a low refractive index layer 332. The second film stack 30 consists of a third filter cavity 31, nine fourth filter cavities 32 and eight fifth filter cavities 33.

In the third filter cavity 31, both the high and low refractive index layers 311, 312 have an optical thickness equal to $1 \times (\lambda_2/4)$. In the fourth filter cavity 32, the high and low refractive index layers 321, 322 both have an optical thickness equal to $1.3 \times (\lambda_2/4)$. In the fifth filter cavity 33, the high and low refractive index layers 331, 332 both have an optical thickness equal to $1 \times (\lambda_2/4)$. If a refractive index of the high refractive index layers 311, 321, 331 is represented with $n_H$, then the physical thicknesses of the high refractive index layers 311, 321, 331 are equal to $(1×(\lambda_2/4))/n_H$, $(1.3×(\lambda_2/4))/n_H$, $(1×(\lambda_2/4))/n_H$, repectively. If a refractive index of the low refractive index layers 312, 322, 332 is represented with $n_L$, then the physical thicknesses of the low refractive index layers 312, 322, 332 are equal to $(1×(\lambda_2/4))/n_L$, $(1.3×(\lambda_2/4))/n_L$, $(1×(\lambda_2/4))/n_L$, respectively.

In the second film stack 30, the high refractive index layers 311, 321 and 331 are made of a material selected from the group consisting of titanium dioxide ($TiO_2$), titanium pentoxide ($TiO_5$) and tantalum pentoxide ($Ta_2O_5$). The low refractive index layers 312, 322 and 332 are made of a material selected from the group consisting of silicon dioxide ($SiO_2$) and aluminum oxide ($Al_2O_3$). For example, the high refractive index layers 311, 321 and 331 are made of $TiO_2$, in which case the reflective index $n_H$ is equal to 2.311. The low refractive index layers 312, 322 and 332 are made of $SiO_2$, in which case the reflective index $n_L$ is equal to 1.473. Because the wavelength of the infrared light is in the range from 747 to 840 nanometers, a value of $\lambda_2$ for the second film stack 30 may be determined. Accordingly, the numerical values of H and L are also determined. A thickness of each layer of the second film stack 30 is shown in Table 1-1. The layers are numbered from an innermost layer attached to the first surface 11 of the transparent substrate 10 to an outermost layer outwardly exposed.

TABLE 2-1

| Number of layer | Thickness |
|---|---|
| 1 | 0.5 H |
| 2 | 0.5 L |
| 3 | 1.3 H |
| 4 | 1.3 L |
| 5 | 1.3 H |
| 6 | 1.3 L |
| 7 | 1.3 H |
| 8 | 1.3 L |
| 9 | 1.3 H |
| 10 | 1.3 L |
| 11 | 1.3 H |
| 12 | 1.3 L |
| 13 | 1.3 H |
| 14 | 1.3 L |
| 15 | 1.3 H |
| 16 | 1.3 L |
| 17 | 1.3 H |
| 18 | 1.3 L |
| 19 | 1.3 H |
| 20 | 1.3 L |
| 21 | H |
| 22 | L |
| 23 | H |
| 24 | L |
| 25 | H |
| 26 | L |
| 27 | H |
| 28 | L |
| 29 | H |
| 30 | L |
| 31 | H |
| 32 | L |
| 33 | H |
| 34 | L |
| 35 | H |
| 36 | L |

The film structure of the second film stack 30 in Table 2-1 may be further optimized by using a predetermined amount of visible light transmission, such as ninety-five percent of the visible light transmission to optimize the coefficient of both the high and low refractive index layers. Thus a group of optimized thickness values for substantially screening out the infrared light can be obtained. The optimized thickness of each layer of the second film stack 30 is shown in Table 2-2. The layers are numbered from an innermost layer connecting with the second surface 12 of the transparent substrate 10 to an outermost layer outwardly exposed.

TABLE 2-2

| Number of layer | Optimized thickness |
|---|---|
| 1 | 0.130 × (0.5 × (0.130 H + 0.274 L)) |
| 2 | 0.274 × (0.5 × (0.130 H + 0.274 L |
| 3 | 1.292 H |
| 4 | 1.315 L |
| 5 | 1.278 H |
| 6 | 1.365 L |
| 7 | 1.302 H |
| 8 | 1.364 L |
| 9 | 1.312 H |
| 10 | 1.372 L |
| 11 | 1.304 H |
| 12 | 1.370 L |
| 13 | 1.306 H |
| 14 | 1.358 L |
| 15 | 1.294 H |
| 16 | 1.349 L |
| 17 | 1.266 H |
| 18 | 1.361 L |
| 21 | 1.069 H |
| 22 | 1.105 L |
| 23 | 0.987 H |
| 24 | 1.063 L |
| 25 | 0.952 H |
| 26 | 1.045 L |
| 27 | 0.942 H |
| 28 | 1.039 L |
| 29 | 0.940 H |
| 30 | 1.040 L |
| 31 | 0.948 H |
| 32 | 1.056 L |
| 33 | 0.971 H |
| 34 | 1.101 L |
| 35 | 0.991 H |
| 36 | 0.544 L |

In the optimized second film stack 30, the values of H and L are not changed, but the coefficients of H and L are changed for optimization. As shown in Table 2-2, the optimized second film stack 30 can be represented as follows:

$0.5(c_1Hc_2L)(d_1Hd_2L)^9(e_1He_2L)^8$, wherein, $c_1$ is 0.130, $c_2$ is 0.274, $d_1$ is in the range from 1.217 to 1.312, $d_2$ is in the range from 1.231 to 1.372, $e_1$ is in the range from 0.940 to 1.069, $e_2$ is the range from 0.544 to 1.105.

Figure 4:
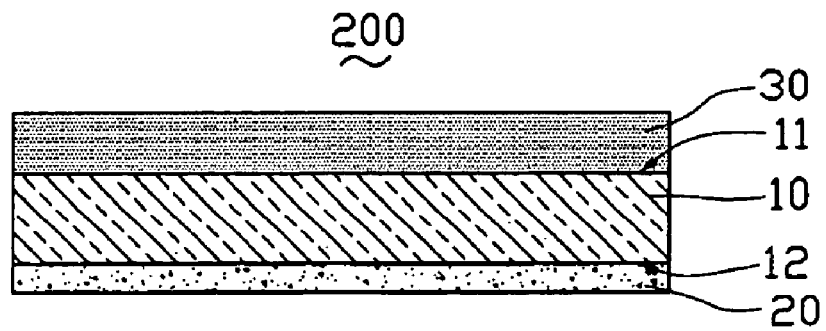
FIG. 4 is a schematic, cross-sectional view of an optical filter for screening out infrared and ultraviolet radiations, in accordance with a second embodiment.

Referring to FIG. 4, an optical filter 200 for screening out ultraviolet and infrared radiations according to a second embodiment is shown. The optical filter 200 includes a transparent substrate 10, a first film stack 20 and a second film stack 30. The transparent substrate 10 has a first surface 11 and a second surface 12. The second film stack 30 is positioned on the first surface 11 of the substrate 10, and the first film stack 20 is positioned on the second surface 12 of the substrate 10.

Figure 5:
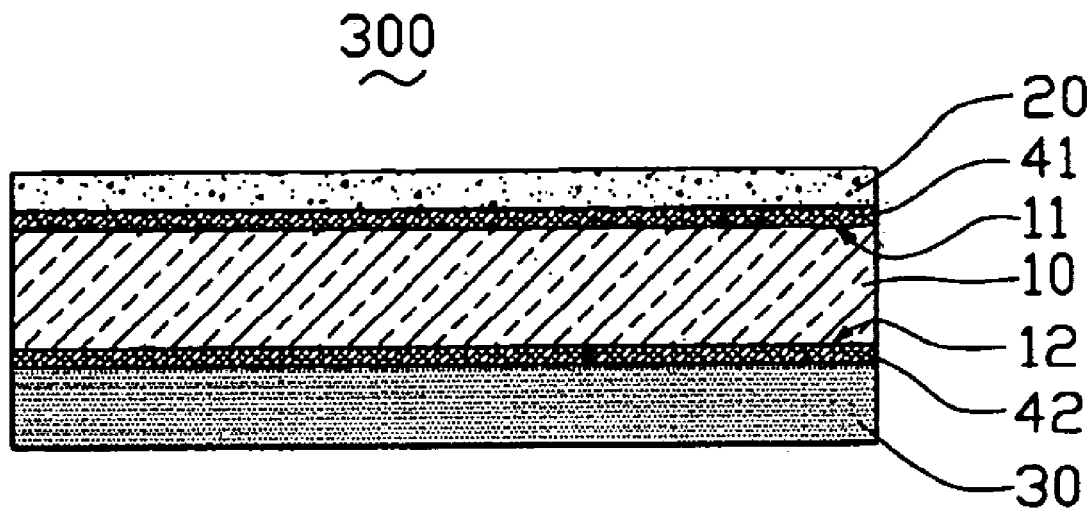
FIG. 5 is a schematic, cross-sectional view of an optical filter for screening out infrared and ultraviolet radiations, in accordance with a third embodiment.

Referring to FIG. 5, an optical filter 300 for screening out ultraviolet and infrared radiations according to a third embodiment is shown. The optical filter 300 includes a transparent substrate 10, a first film stack 20, a second film stack 30, and two similar anti-reflective films 41, 42. The transparent substrate 10 has a first surface 11 and a second surface 12. The anti-reflective film 41 is positioned on the first surface 11, and the first film stack 20 is positioned on the anti-reflective film 41. The anti-reflective film 42 is positioned on the second surface 12, and the second film stack 30 is positioned on the anti-reflective film 42.

Figure 6:
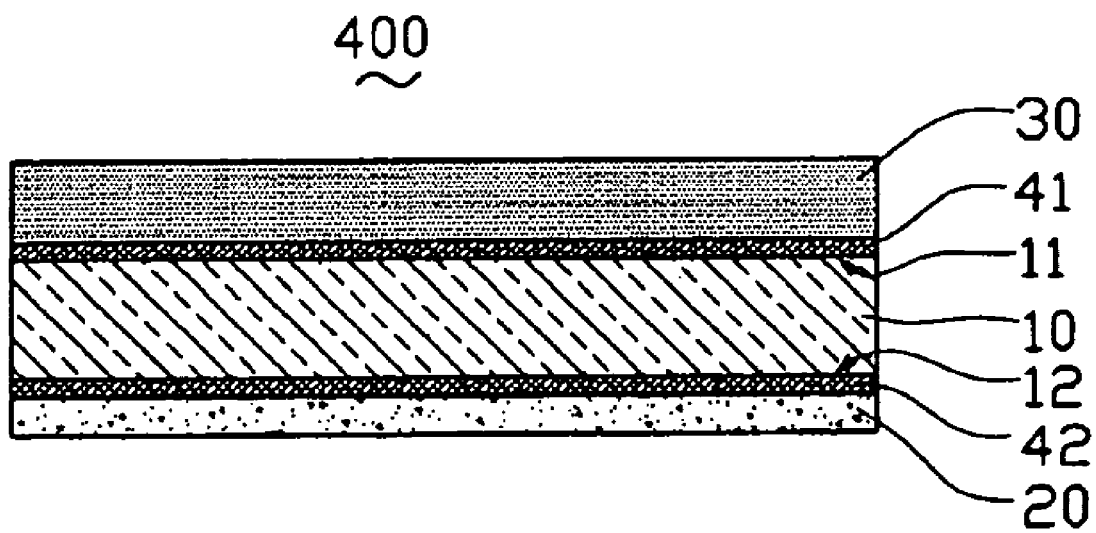
FIG. 6 is a schematic, cross-sectional view of an optical filter for screening out infrared and ultraviolet radiations, in accordance with a fourth embodiment.

Referring to FIG. 6, an optical filter 300 for screening out ultraviolet and infrared radiations according to a fourth embodiment is shown. The optical filter 300 includes a transparent substrate 10, a first film stack 20, a second film stack 30, and two anti-reflective films 41, 42. The transparent substrate 10 includes a first surface 11 and a second surface 12. The anti-reflective film 41 is positioned on the first surface 11, and the second film stack 30 is positioned on the anti-reflective film 41. The anti-reflective film 42 is positioned on the second surface 12, and the first film stack 20 is positioned on the anti-reflective film 42.

Alternatively, the anti-reflective film may not be brought into contact with the transparent substrate 10, instead of being configured on the first film stack 20 or on the second film stack 30. In the third and fourth embodiment, the anti-reflective film is made of a material similar to that of the infrared and ultraviolet cut-off films, but the structure of the anti-reflective film is different to that of the infrared and ultraviolet cut-off films. Each of the anti-reflective films 41, 42 has four layers, i.e. a first high refractive index layer, a first low refractive index layer, a second high refractive index layer and a second low refractive index layer successively stacked on the transparent substrate 10. The optical thickness of the high and low refractive index layers of the anti-reflective film 41, 42 is equal to that of the high and low refractive index layers of the first film stack 20 and the second film stack 30 respectively and the respective coefficients of the first and second high refractive index layers is 0.301, 2.546. The resulting optical thicknesses of first and second high refractive index layers will be equal to $0.301 \times (\lambda_1/4)$ nanometers, $2.546 \times (\lambda_1/4)$ nanometers respectively. If the coefficients of the first and second low refractive index films are 0.421, 1.137 respectively, then the respective optical thickness of the first and second low refractive index layers will be equal to $0.421 \times (\lambda_2/4)$ nanometers, $1.137 \times (\lambda_2/4)$ nanometers. The first and second high refractive index layers are made of $Ti_3O_5$, and the first and second low refractive index layers are made of $SiO_2$.

The present optical filter is capable of screening out both the ultraviolet radiation and the infrared radiation, and can generally be applied in automobile and airplane windows and thus protect drivers and passengers. The present multilayer structure of the optical filter has an excellent filtering efficiency In addition, an anti-reflective film can be added for preventing the visible light from being reflected by the transparent substrate 10 on the optical filter, thus, the visible light transmission of the optical filter can be greatly increased.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. An optical filter for screening out infrared and ultraviolet light, comprising:

a transparent substrate having a first surface and an opposite second surface;

a first film stack formed on the first surface of the substrate; and a second film stack formed on the second surface of the substrate, the first and second film stacks each comprising a plurality of high refractive index layers and a plurality of low refractive index layers alternately stacked one on another, wherein the first film stack is defined as follows:

$(HL)^7(0.76H0.76L)^6$ wherein H represents a high refractive index layer having a base optical thickness equal to one fourth of a first reference wavelength associated with the optical filter, L represents a low refractive index layer having a base optical thickness equal to one fourth of said first reference wavelength associated with the optical filter, the expression enclosed in each parenthesis represents a filter cavity, and superscripts represent the number of repetitions of the expression enclosed in the parenthesis;

the second film stack is defined as follows:

$0.5(HL)(1.3H1.3L)^9(HL)^8$ wherein, H represents a high refractive index layer having a base optical thickness equal to one fourth of a second reference wavelength associated with the optical filter, L represents a low refractive index layer having a base optical thickness equal to one fourth of said second reference wavelength associated with the optical filter, the expression enclosed in each parenthesis represents a filter cavity, and the superscript represents the number of repetitions of the expression enclosed in the parenthesis.

2. The optical filter as claimed in claim 1, wherein the high refractive index layer is made of a material selected from the group consisting of titanium dioxide ($TiO_2$), titanium pentoxide ($TiO_5$) and tantalum pentoxide ($Ta_2O_5$), the low refractive index layer is made of a material selected from the group consisting of silicon dioxide ($SiO_2$) and aluminum oxide ($Al_2O_3$).

3. The optical filter as claimed in claim 1, further comprising an anti-reflective film configured between the first film stack and the first surface of transparent substrate.

4. The optical filter as claimed in claim 3, further comprising an anti-reflective film configured between the second film stack and the second surface of transparent substrate.

5. The optical filter as claimed in claim 3, wherein the anti-reflective film is comprised of a plurality of high refractive index layers and a plurality of low refractive layers alternately stacked one on another.

6. The optical filter as claimed in claim 5, wherein the anti-reflective film is composed of two $Ti_3O_5$ layers and two $SiO_2$ layers.

7. The optical filter as claimed in claim 6, wherein respective thickness coefficients of the two $Ti_3O_5$ layers are 0.301, 2.546, and the respective thickness coefficients of the two $SiO^2$ layers are 0.421, 1.137.

8. An optical filter for screening out infrared and ultraviolet light, comprising:

a transparent substrate having a first surface and an opposite second surface;

a first film stack formed on the first surface of the substrate; and a second film stack formed on the second surface of the substrate, the first and second film stacks each comprising a plurality of high refractive index layers and a plurality of low refractive index layers alternately stacked one on another, each high refractive index layer is made of $TiO_2$, each low refractive index layer is made of $SiO_2$, wherein the first film stack is defined as follows:

$$(a_1Ha_2L)^7(b_1Hb_2L)^6$$

wherein, H represents a high refractive index layer having a base optical thickness equal to one fourth of a first reference wavelength associated with the optical filter, L represents a low reference index layer having a base optical thickness equal to one fourth of the first reference wavelength associated with the optical filter, the expression enclosed in each parenthesis represents a filter cavity, and the superscript represents the number of repetitions of the expression enclosed in the parenthesis;

the second film stack is defined as follows:

$$0.5(c_1Hc_2L)(d_1Hd_2L)^9(e_1He_2L)^8$$

wherein, H represents a high refractive index layer having a base optical thickness equal to one fourth of a second reference wavelength associated with the optical filter, L represents a low reference index layer having a base optical thickness equal to one fourth of the second reference wavelength associated with the optical filter, $a_1$ is in the range from 0.372 to 1.064, $a_2$ is in the range from 0.962 to 1.203, $b_1$ is in the range from 0.477 to 0.946, $b_2$ is in the range from 0.389 to 2.183, $c_1$ is 0.130, $c_2$ is 0.274, $d_1$ is in the range from 1.217 to 1.312, $d_2$ is in the range from 1.231 to 1.372, $e_1$ is in the range from 0.940 to 1.069, $e_2$ is in the range from 0.544 to 1.105, the expression enclosed in each parenthesis represents a filter cavity, and the superscript represents the number of repetitions of the expression enclosed in the parenthesis.

* * * * *